United States Patent [19]

Brown et al.

[11] Patent Number: 4,666,683

[45] Date of Patent: May 19, 1987

[54] PROCESS FOR REMOVAL OF COPPER FROM SOLUTIONS OF CHELATING AGENT AND COPPER

[75] Inventors: Craig J. Brown, Pickering; Michael J. Dejak, North York, both of Canada

[73] Assignee: Eco-Tec Limited, Pickering, Canada

[21] Appl. No.: 800,247

[22] Filed: Nov. 21, 1985

[51] Int. Cl.$^4$ ............................................. C01G 3/00
[52] U.S. Cl. .............................. 423/24; 423/DIG. 14; 423/42; 75/101 BE; 75/108; 75/117; 210/660; 210/667; 210/670; 210/681; 210/685; 210/702
[58] Field of Search ................... 423/24, DIG. 14, 42; 35/101 DE, 117, 108; 210/660, 667, 681, 670, 685, 702

[56] References Cited

U.S. PATENT DOCUMENTS

| | | | |
|---|---|---|---|
| 3,385,788 | 5/1968 | Hunter | 210/678 |
| 3,386,914 | 6/1968 | Hunter | 210/678 |
| 3,998,924 | 12/1976 | Jones et al. | 423/24 |
| 4,031,038 | 6/1977 | Grinstead et al. | 423/24 |
| 4,098,867 | 7/1978 | Grinstead et al. | 423/24 |
| 4,202,944 | 5/1980 | Hancock et al. | 423/24 |
| 4,303,704 | 12/1981 | Courduvelis et al. | 423/24 |

FOREIGN PATENT DOCUMENTS 6090936 7/1981 Japan ..................................... 423/24

OTHER PUBLICATIONS

Grinstead, R. R. "New Developments in the Chemistry of XFS4195 and XFS4308 for Chelating Ion Exchange Resins" in *Ion Exchange Technology* by Naden (1984).

J. Melling and D. W. West "A Comparative Study of Some Chelating Ion Exchange Resins for Application in Hydrometallurgy" in *Ion Exchange Technology* by Naden (1984).

Peck, J. V. and Spearot, R. M. "Copper Removal from Metal Finishing Waste Solutions" Proc. 70th Annual Technical Conference of American Electroplaters Society, Jun. 1983, Indianapolis, In.

B. R. Green and R. D. Hancock, "Recent Advances in the Development of Resins for use in Hydrometallurgy", Proc. Hydrometallurgy 81, Jun. 30, 1978, Manchester.

B. R. Green and R. D. Hancock, "Useful Resins for the Selective Extraction of Copper, Nickel and Cobalt", Journal of South African Institute of Mining and Metallurgy, Oct., 1982, 303–307.

"General Concepts of the Chemistry of Chelation", Versene Product Information, Dow Chemical Co., 1974.

"Properties of EDTA, DTPA, HEDTA and NTA", Versene Product Information, Dow Chemical Co., 1974.

"Solubility of the Various Sodium Salts of EDTA, DTPA, HEDTA and NTA", Versene Product Information, Dow Chemical Co., 1974.

(List continued on next page.)

*Primary Examiner*—John Doll
*Assistant Examiner*—Robert L. Stoll
*Attorney, Agent, or Firm*—Rogers, Bereskin & Parr

[57] ABSTRACT

A process is provided for removing copper from a solution containing same with a chelating agent. The process is advantageously practiced on aqueous effluents from electroless plating systems to remove copper from an aminopolycarboxylic acid chelating agent such as ethylene diaminetetraacetic acid (EDTA). The process comprises contacting an acidic solution containing copper, and optionally ferric iron ions, and the chelating agent with a water insoluble ion exchange resin having a picolylamine or a pyridyl-imidozole functionality, whereby copper is selectively retained by the resin and the chelating agent remains in solution, and then removing the solution from the resin.

24 Claims, 3 Drawing Figures pH PROFILE FOR COPPER AND IRON (III)

OTHER PUBLICATIONS

"Effect of Environment on Chelation", Versene Product Information, Dow Chemical Co., 1974, 1978.

"Treatments for Complexed and Chelated Rinsewaters", Dr. R. E. Wing, AES illustrated Lecture Series, American Electroplaters Society, Inc. 1980.

"New Selective Ion Exchange Resins for Copper and Nickel", R. R. Grinstead, W. A. Nasutavicus, R. M. Wheaton and K. C. Jones, International Symposium on Copper Extraction and Refining, vol. II, 105th AIME Annual Meeting, 1009–1024 Feb. 1976, Las Vegas, Nevada.

"Properties and Hydrometallurgical Applications of Two New Chelating Ion Exchange Resins," K. C. Jones, and R. R. Grinstead, Chemistry and Industry, 637–641, Aug. 6, 1977.

"Copper Selective Ion Exchange Resin With Improved Iron Rejection", R. R. Grinstead, 108th AIME Annual Meeting, Feb., 1979, New Orleans, La.

"Selective Absorption of Copper, Nickel, Cobalt and Other Transition Metal Ions From Sulfuric Acid Solutions With the Chelating Ion Exchange Resin XFS4195", R. R. Grinstead, 12 Hydrometallurgy 387–400 (1984).

pH PROFILE FOR COPPER AND IRON (III)

PROCESS FOR REMOVAL OF COPPER FROM SOLUTIONS OF CHELATING AGENT AND COPPER

FIELD OF THE INVENTION

The present invention relates to processes for removing copper from solutions containing same with chelating agents.

BACKGROUND OF THE INVENTION

Aqueous baths and solutions containing chelating agents and chelated heavy metals are often used in the electroless deposition of heavy metals, as well as in metal etching. The electroless deposition process is particularly utilized to deposit nickel on steel or a heavy metal such as copper on plastic. The latter process is widely utilized in the printed circuit industry. These and other industries generate effluent solutions, either as a waste rinsewater stream, or a spent bath concentrate, which contains one or more heavy metals complexed with a chelating agent. The presence of the chelating agent, which bonds strongly to the heavy metals, prevents the routine removal of the heavy metals from these solutions. The removal of the heavy metals is desirous either for recovery, or waste treatment purposes. Effluent concentrations of heavy metals from the above-mentioned sources must normally be reduced to levels of less than about 3 mg/L and sometimes to levels of less than 1 mg/L to meet government regulations.

The conventional technique for treatment of heavy metal bearing wastewaters is to raise the pH of the stream with an alkali such as sodium or calcium hydroxide, causing the metal to precipitate from solution as the hydroxide. The effect of the chelating agent is to hold the metal in solution and prevent this precipitation process. If excess chelating agent is present in the solution, as is often the case, precipitation of metals originating from other effluent streams that may be mixed in will also be impeded.

The two principal chelating agents used in electroless copper plating are ethylenediaminetetraacetic acid (EDTA) and N,N,N',N'-tetrakis-(2-hydroxypropyl)-ethylenediamine (Quadrol). The former, in the inventors' experience, presents particularly difficult problems in removing copper from the solutions in which it is contained.

One known method for treatment of EDTA as well as Quadrol bearing wastewaters, is to lower the pH to between 2.7 and 5.0 and add an iron salt, either in the ferric or ferrous form. (J. V. Peck, R. M. Spearot, "Copper Removal from Metal Finishing Waste Solutions", Proc. 70th Annual Technical Conference of American Electroplaters' Society, June 1983, Indianapolis, Ind.) Lowering the pH weakens the copper complex and facilitates the substitution of the copper for iron. It has been stated that a seven times stoichiometric excess of iron is necesary to displace the copper. The pH is then raised to 9.0, using sodium or calcium hydroxide and copper hydroxide precipitates from solution.

Although effective, the above technique is disadvantageous in that a considerable excess of iron is required. In addition, the separation of the metal hydroxide precipitate from the liquid is, in itself, a difficult problem. The resulting precipitate of copper contains considerable water and is highly contaminated with iron, both of which have the result of rendering the copper precipitate of no value and usually of considerable liability.

U.S. Pat. No. 4,303,704 issued Dec. 1, 1981, to C. Courduvelis et al., teaches a method of removal of copper complexed with alkanolamines, ammonia or carboxylic acids or their salts, or nickel complexed with ammonia or carboxylic acids or their salts. This method employs a chelating type ion exchange resin with an iminodiacetic acid funtionality such as Amberlite IRC 718, manufactured by Rohm and Haas Company. The solution containing the complexed heavy metal ions and complexing ions are retained in the resin bed, while the effluent passing out of the resin bed contains the chelating agent, but is substantially free of complexed heavy metal ions. The retained heavy metal ions are eluted from the resin by passage of an aqueous acid solution through the bed, whereby the eluate contains heavy metal ions and is substantially free of chelating agents.

The process described in U.S. Pat. No. 4,303,704 was found by the inventors to be ineffective in removing heavy metals from solutions containing the chelating agent EDTA.

SUMMARY OF THE INVENTION

In accordance with the present invention, the inventors have discovered that a water insoluble ion exchange resin having a picolylamine or a pyridylimidazole functionality can be used to remove a heavy metal from an acidic solution containing the heavy metal with a chelating agent. Unexpectedly, these types of resin have been found to be effective under acidic conditions in removing copper from chelating agents such as ethylenediaminetetraacetic acid (EDTA) which have presented difficulties in past removal attempts. The process can be utilized for waste treatment purposes to remove copper from waste effluents containing chelating agents, particularly effluents from industries involved in the electroless disposition of heavy metals or metal etchant applications. The process can also be utilized to recover copper, or lower the concentration of same, from solutions, particularly when the copper is concentrated for example in a spent electroless plating bath.

In accordance with another aspect of the invention, the inventors have discovered that a water insoluble ion exchange resin having a picolylamine or a pyridylimidazole functionality, under acidic conditions, is selective in the removal of copper when the ferric or ferrous iron is added to the solution of copper with a chelating agent. Without being bound by the same, it is believed that these particular resins under acidic conditions selectively remove copper from the solution with the chelating agent and iron because the resins both have a higher stability constant for copper than for iron, which stability constant must be higher than the stability constant for copper with the chelating agent.

Table I provides a list of Log K values for copper and iron with aminopolycarboxylic acid type chelating agents. If several metals are present in one solution, the chelating agent will generally react with metals in order of decreasing Log K values.

TABLE 1*

LOG K VALUES OF METAL CHELATES WITH EDTA[1], DTPA[2], HEDTA[3], and NTA[4].

| Metal | EDTA Log K | DTPA Log K | HEDTA Log K | NTA Log $K_1$ | Log $K_2$ | Log $K_1K_2$ |
|---|---|---|---|---|---|---|
| Fe(III) | 25.1 | 28.6 | 19.8 | 15.9 | 9.9 | 25.8 |

TABLE 1*-continued
LOG K VALUES OF METAL CHELATES WITH
EDTA[1], DTPA[2], HEDTA[3], and NTA[4].

| Metal | EDTA Log K | DTPA Log K | HEDTA Log K | NTA Log $K_1$ | NTA Log $K_2$ | NTA Log $K_1K_2$ |
|---|---|---|---|---|---|---|
| Cu(II) | 18.8 | 21.1 | 17.4 | 12.7 | 3.6 | 16.3 |

*Log K Values taken from "Keys to Chelation" published by Dow Chemical Co.
[1]Ethylenediaminetetraacetic acid (EDTA)
[2]Diethylenetriaminepentacetic acid (DTPA)
[3]N—(Hydroxyethyl)ethylenediaminetriacetic acid (HEDTA)
[4]Nitrilotriacetic acid (NTA)

The discovery that a picolyamine resin or a pyridylimidazole resin will selectively remove copper from solutions containing iron and copper with a chelating agent can be exploited as follows. It is possible to weaken a copper chelate complex, to aid in the removal of that metal, by adding iron, either in the ferric or ferrous form, to the solution. If ferrous iron is added, the cupric ions are reduced to cuprous ions and the ferrous ions are oxidized to ferric ions. When an acidic solution containing copper, iron and chelating agent is then contacted with the resin, copper, with the lower stability constant with the chelating agent, is selectively retained and thus removed by the resin. Ferric iron is removed with the chelating agent in the solution.

The present invention provides a process for removing from an acidic solution containing copper and a chelating agent, comprising contacting the acidic solution with a water insoluble ion exchange resin having a picolylamine or a pyridyl-imidazole functionality, whereby copper is retained by the resin and the chelating agent remains in the solution, and removing the solution containing the chelating agent from the resin, said solution having a substantially reduced content of copper.

In another aspect of the invention, the process is practiced with an acidic solution containing both copper and iron and a chelating agent. This acidic solution is contacted with a water insoluble ion exchange resin having a picolylamine or a pyridyl-imidazole functionality so that copper is selectively retained by the resin and the majority of iron is removed with the chelating agent in the solution. Iron, as used in this application, is meant to include both ferric and ferrous iron.

The process is practiced under acidic conditions to weaken the bond of the copper with the chelating agent. During the contacting step, a pH of less than about 5.0 is preferred. More preferably, the contacting step is conducted at a pH in the range of about 2.0 to 3.0.

In a preferred embodiment the process is practiced on solutions containing copper and an aminopolycarboxylic acid-type chelating agent, for example, EDTA. The bonding of copper to the chelating agent can be weakened to facilitate the removal of copper, either by contacting the resin under acidic conditions, preferably at a pH less than about 5.0 and more preferably at a pH in the range of about 2.0 to 3.0, and/or by adding ferric or ferrous iron ions to the solution prior to contacting with the resin. Resins with a picolylamine or a pyridyl-imidazole functionality, unlike the prior art iminodiacetate resins, will exchange copper at low pH levels and have a high selectivity for copper over ferric iron at a low pH.

Particularly preferred ion exchange resins have bispicolylamine or a N-(2-hydroxypropyl) picolylamine functionalities.

After contacting the solution with the resin, and removing the solution containing the chelating agent from the resin, the copper retained by the resin is removed and the resin regenerated with an acidic solution. When resins with a bispicolylamine functionality are employed, the resin is regenerated with a strong acid, preferably with a strong aqueous acid such as 10N sulphuric acid. When the resin has an N-(2-hydroxypropyl) picolylanine functionality, it is preferably regenerated with an aqueous acid, for example 1-2N sulphuric acid.

DESCRIPTION OF THE PREFERRED EMBODIMENTS

Figure 1:
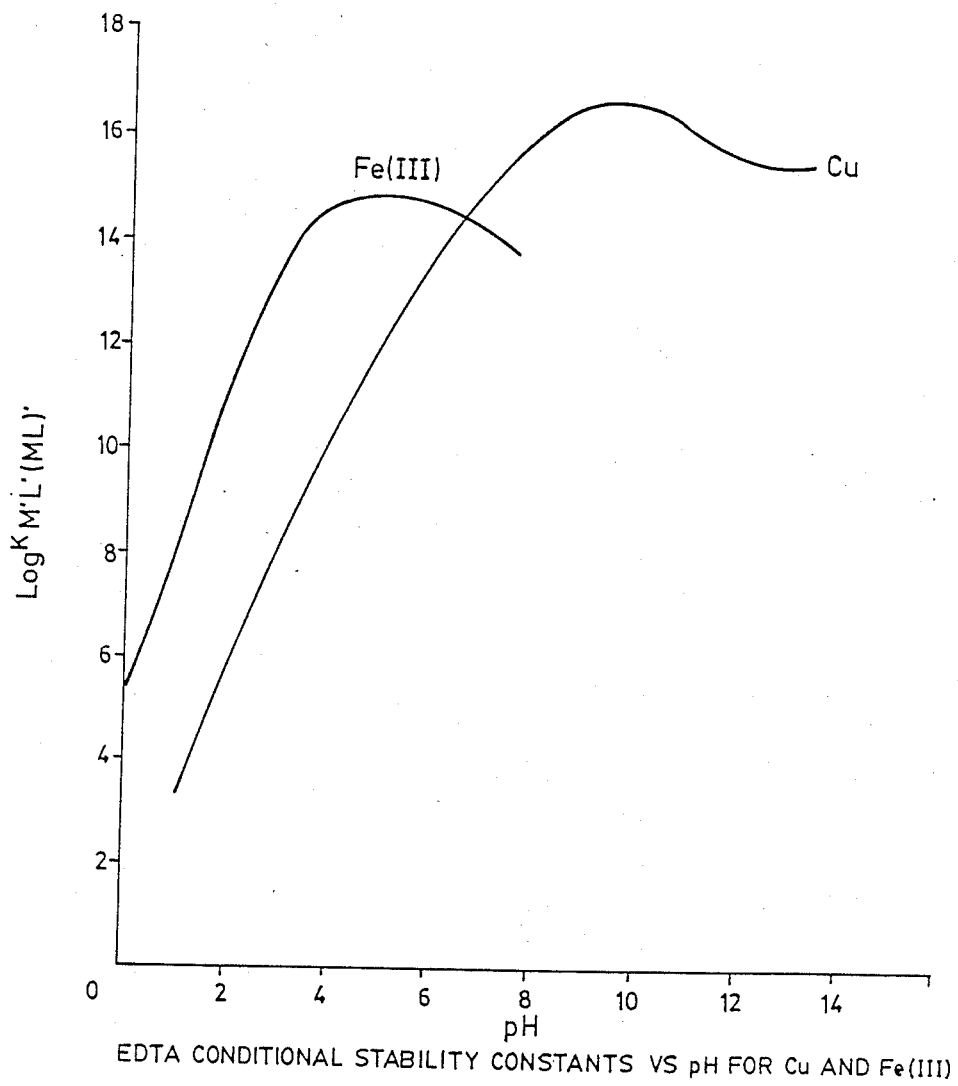
FIG. 1 is a graph showing the effect of pH on the stability constants of EDTA with copper and iron.

The present invention involves a process for removing or recovering copper from an acidic solution containing a chelating agent by contacting with a water insoluble ion exchange resin having a picolylamine or a pyridyl-imidazole functionality. These resins have been found, surprisingly, to be selective for copper in the presence of a chelating agent at a lower pH than could be used for other resins such as iminodiacetate resins. This makes the resins particularly useful in removing copper from a very stable complex with a chelating agent such as EDTA.

Resins having a picolylamine functionality are described in U.S. Pat. Nos. 4,031,038 and 4,098,867 issued to Robert R. Grinstead, et al. Generally speaking, the resins consist of an aminopyridine functionality on a polymer matrix resin. Particularly preferred resins are those having a bispicolylamine functionality or an N-(2-hydroxypropyl) picolylamine functionality. Two such resins are commercially available from the Dow Chemical Company under the trade names Dowex 4195 and Dowex XFS 43084. The former has a bispicolylamine functionality and the latter has an N-(2-hydroxypropyl)picolylamine functionality.

It will be appreciated that other resins having a picolylamine functionality, as will be evident to persons skilled in the art, can be used in the process while still keeping within the scope of the present invention.

Resins havinq a pyridyl-imidazole functionality are described in two recent publications, B. R. Green and R. D. Hancock, "Recent Advances in the Development of Resins for Use in Hydrometallurgy", Proceedings Hydrometallurgy 81, June 30, 1981, Manchester, and B. R. Green and R. D. Hancock, "Useful Resins for the Selective Extraction of Copper, Nickel and Cobalt", Journal of the South African Institute of Mining and Metallurgy, October 1982, at pg. 303–307, and in the references cited in each of these publications. Generally speaking, these resins consist of a pyridyl-imidazole or a substituted pyridyl-imidazole, for example, a pyridyl-methyl-imidazole functionality on a polymer matrix resin. These resins are preferred over the prior art iminodiacetate resins because of their low operating pH and their selectivity for copper over ferric iron.

Because the above resins are effective at low pH values, the process is most advantageously practiced with copper which bonds strongly to a chelating agent such as EDTA, but whose bonds can be weakened with acidic conditions. It is particularly difficult to remove copper from EDTA, since the copper/EDTA complex is stable even at a pH of 1.0. A resin such as the iminodiacetic acid resin has been found to be ineffective in removing copper at such a reduced pH. As mentioned above, copper is often complexed with an aminopolycarboxylic acid-type chelating agent such as EDTA in waste streams or spent baths from the electroless deposition of copper.

Chelating agents frequently encountered in waste effluents are those of the aminopolycarboxylic acid-type. Exemplary of these chelating agents are ethylenediaminetetraacetic acid (EDTA), diethylenetriaminepentaacetic acid (DTPA), N-(hydroxyethyl)-ethylenediaminetriacetic acid (HEDTA), and nitrilotriacetic acid (NTA). EDTA is often used for electroless deposition applications, and thus is most frequently encountered.

The process is practiced by contacting an acidic solution containing copper and chelating agent with the resin of a picolylamine or pyridyl-imidazole functionality, whereby copper is retained on the resin and the chelating agent remains in solution. The solution, with a substantially reduced content of the copper is then removed from the resin.

To remove the copper from the resin, and to regenerate the resin, an acid solution, preferably a strong aqueous acid solution is used. Inorganic acids such as sulphuric acid or hydrochloric acid are preferred.

Preferably, the process is conducted by passing an acidic solution containing copper and the chelating agent through a column or a bed containing the resin. Copper is retained by the resin, and the chelating agent, which remains in solution, is removed as the effluent passes out of the column. To regenerate the resin, and remove the copper from the resin, an acid solution is then passed through the column or bed.

In particular preferred embodiments the process is practiced with resins having a particle size which is finer and columns considerably shorter than are normally utilized in ion exchange. Such preferred conditions are taught in U.S. Pat. Nos. 3,386,914 and 3,385,788.

The conditions used in the present process will vary with the particular chelating agent present, and with the particular resin being employed. The contacting step is conducted with an acidic solution of copper and the chelating agent in order to weaken the bonds in the copper-chelate. Since many of the waste streams or spent baths produced by industry, are alkaline, the waste solution must often be acidified prior to contacting with the resin. Inorganic acids such as sulphuric acid or hydrochloric acid are preferred. A solution pH of less than about 5.0 is preferred for the contacting step, but this will vary with the particular chelating agent and resin. A solution pH in the range of about 2.0 to 3.0 is more preferably used.

As stated above, in the regeneration step, an acid solution is used, preferably a strong aqueous acid. The desired pH of this solution will vary with the particular resin. For instance, a resin with a bispicolylamine functionality has been found to strongly bind a metal such as copper, and thus such a resin is preferably regenerated with a very strong acid. A 10N solution of sulphuric acid is most preferred. On the other hand, a resin with an N-(2-hydroxypropyl)picolylamine functionality can be regenerated with a weaker acid solution. Aqueous sulphuric acid which is in the range of about 1 to 2N is preferred.

As previously stated, the solution is contacted with the resin under acidic conditions to weaken the bonds between the copper and the chelating agent. These bonds can also be weakened, or can be further weakened, by adding ferric or ferrous iron to the solution. Exemplary iron salts are ferric chloride and ferrous sulphate. As mentioned previously, ferrous iron will be converted to ferric iron with the reduction of the cupric ions. Ferric iron forms a metal chelate with a higher stability constant, K, than the corresponding stability constant of copper, which is to be removed when the chelating agent is of an aminopoly-carboxylic acid-type. (See Table I and Figure I.) Resins having a picolylamine or a pyridyl-imidazole functionally, in accordance with the present invention, will then selectively retain copper, which has the lower stability constant. Iron is removed with the chelating agent in the solution.

It should be pointed out that the term selectively retained, as used herein, is not meant to indicate that the resin will remove one metal exclusively. Rather, it will be understood by the expression that the resin exhibits a preferential affinity for one of the heavy metals in the solution. Thus, when the process is practiced with both copper and iron, the effluent will have a significantly reduced content of copper.

Preferably, the process is utilized to remove copper from copper chelate-containing solutions, most frequently copper/EDTA containing solutions. In these circumstances, ferric or ferrous iron ions can be introduced to the acidic copper/EDTA solution. As is evident from Table I, the ferric iron, which has a higher stability constant with EDTA than does copper, will become complexed with the chelating agent. The copper will thus be exchanged from the solution onto the resin. A solution pH of less than about 3.0 is preferably used. More preferably, the solution is adjusted to a pH in the range of about 1.0 to 3.0 with an aqueous acid such as sulphuric or hyrochloric acid.

Figure 2:
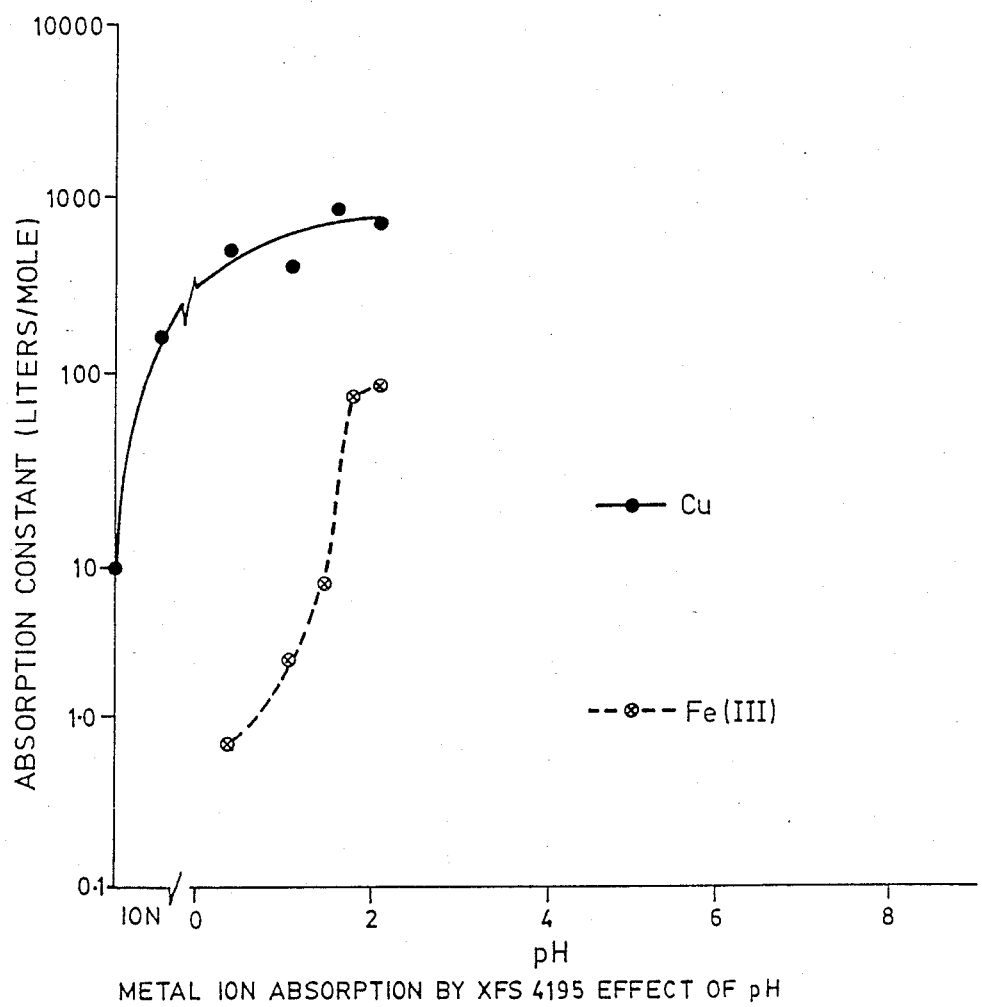
FIG. 2 is a graph showing the effect of pH on the absorption constant of a picolylamine resin, Dowex XFS 4195, manufactured by Dow Chemical Company, with copper and iron.

As mentioned previously, the pH of the solutions used in both the contacting step and the resin regenerating step will vary with the particular resin being used. The manufacturer of the resin will often indicate the preferred operating pH of the resin. In FIG. 2, the effect of pH or the heavy metal absorption of the resin Dowex XFS-4195 (bispicolylamine functionality) is shown. It will be noticed that copper can be removed from solutions at a pH well below 1.0. The lower pH for this resin is therefore very low.

Figure 3:
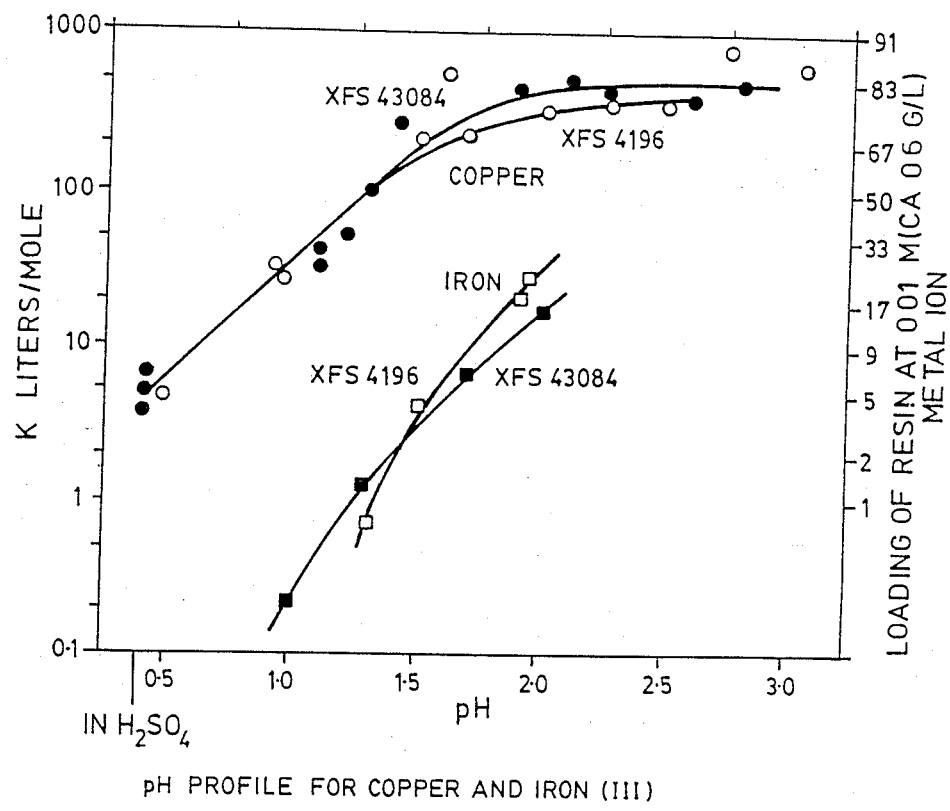
FIG. 3 is a graph showing the effect of pH on the absorption constant, K, of two picolylamine resins, Dowex 4196 and Dowex XFS 43084, manufactured by Dow Chemical Company, with iron and copper.

In FIG. 3, the operating pH range of Dowex XFS 4196 (N-(2-hyroxyethyl)picolylamine functionality) is contrasted with that of Dowex XFS 43084 (N-2(-hydroxypropyl)picolylamine functionality). The pH range of the latter does not extend as low as that of Dowex XFS 4196. However, Dowex XFS 43084 is shown to be highly selective for copper over ferric iron. This resin can also be regenerated with weaker acid solutions than are used for Dowex XFS 4196. Thus, Dowex XFS 43084 is the preferred resin for selectively removing copper from solutions containing copper, ferric iron and a chelating agent.

The following examples are included to demonstrate the operability, efficiency and preferred operating parameters of the process of the present invention. The examples are illustrative of, but do not limit the scope of the invention.

EXAMPLE I

A solution was prepared to approximate a waste rinsewater stream from electroless copper plating. EDTA, designated Noviganth HC by the manufacturer Chemcut Corporation of State College, Pennsylvania, was prepared according to the manufacturer's recommendations. The plating solution was diluted with a simulated softened tap water to simulate a rinsewater containing Cu=70 mg/L, an undetermined amount of EDTA and a pH=9.8. The analysis of the simulated softened tap water is listed in Table II.

TABLE II

| SOFTENED TAP WATER COMPOSITION | |
|---|---|
| | mg/L |
| Na | 79.4 |
| K | 1.5 |
| $SO_4$ | 13.0 |
| Cl | 8.8 |
| $SiO_2$ | 21.0 |
| $NO_3$ | 0.4 |
| alkalinity (as $CaCO_3$) | 131.0 |

A column approximately 2" diameter by 3" high containing approximately 155 mL of crushed Dowex XFS 4195 was assembled. The crushed resin had a particle size of approximately 80–120 mesh.

The rinsewater was acidified with sulphuric acid to an acidity of 0.5 N, (pH≦1). The solution was passed downflow through the column at a flow rate of 825 mL/min, corresponding to a velocity of 10 gpm/ft². After processing approximately 25 liters or 162 bed volumes of rinsewater, the resin was regenerated by passing 155 mL of 10 N sulphuric acid into the bottom of the column and out the top at a flow rate of 250 mL/min or 3 gpm/ft². It was then rinsed by passing 310 mL or 2 bed volumes of water into the bottom of the column and out the top at a flow rate of 250 mL/min or 3 gpm/ft². The cycle was repeated four times. On the fourth cycle the rinsewater leaving the bottom of the column was collected into 10 equal samples and analyzed for copper. The copper concentrate ranged from 0.3 mg/L to 2.2 mg/L corresponding to removal efficiencies of 98.5% to 89%. These results are summarized in Table III. The amount of copper exchanged by the resin is calculated as 3.06 grams per liter of resin. It should be noted that although the rinsewater contained about four times as much sodium as copper, the resin was still effective in removing copper. The level of copper in the effluent was sufficiently low to allow direct discharge in many localities.

EXAMPLE II

An experiment was conducted as in Example 1, except that ferric nitrate was added to the feed, corresponding to a concentration of Fe=100 mg/L. Sulphuric acid was added to achieve pH=1.0. On the second cycle, the rinsewater leaving the column was analyzed for copper and iron. The results are summarized in Table III. The copper concentration averaged 0.31 mg/L, representing a removal efficiency of 98.5%, while the iron concentration averaged 97 mg/L, corresponding to a removal efficiency of only 3%. The amount of copper exchanged by the resin was calculated as 3.19 grams per liter of resin, while the amount of iron exchanged was 0.567 grams per liter.

EXAMPLE III

A column 2" in diameter by 6" high was filled with approximately 310 mL of crushed Dowex XFS 43084 resin with a particle size of approximately 80–120 mesh.

Rinsewater was prepared as in Examples I and II, except that, to more accurately represent the wastewater leaving the plating line, alkaline cleaner solution containing sodium hydroxide, ethanolamine, isopropyl alcohol, and ethyleneglycol was mixed in. The simulated rinsewater contained Cu =36 mg/L, Fe =200 mg/L, and had a pH of 2.4.

Approximately 18.6 L or 60 bed volumes of rinsewater were treated each cycle at a flow rate of 412 mL/min or 5 gpm/ft². Prior to regenerating the resin, the column was rinsed with 620 mL of water at a flow of 250 mL/min or 3 gpm/ft². Regeneration was accomplished by passing 310 mL of 2 N sulphuric acid into the bottom of the column and out the top at a flow rate of 250 mL/min. The column was then rinsed by passing 930 mL or 3 bed volumes of water into the bottom of the column and out the top at a flow rate of 250 mL/min.

On the fourth cycle, the rinsewater leaving the column was divided into ten equal samples and analyzed for copper and iron. The results are summarized in Table III.

The copper concentration was less than 0.1 mg/L throughout the cycle, representing a removal of greater than 99.7% while the iron concentration ranged from 125 to 180 mg/L, with an average of 154 mg/L, representing an average removal of 23%. The amount of copper exchanged by the resin was calculated as 2.16 grams of copper per liter of resin, while the amount of iron exchanged was 2.76 grams per liter of resin.

TABLE III

| | Example 1 | Example 2 | | Example 3 | |
|---|---|---|---|---|---|
| Sample # | Cu | Cu | Fe | Cu | Fe |
| feed | 20 | 20 | 100 | 36 | 200 |
| 1 | 0.3 | 0.3 | 87 | 0.1 | 130 |
| 2 | 0.4 | 0.2 | 95 | 0.1 | 125 |
| 3 | 0.5 | 0.3 | 95 | 0.1 | 135 |
| 4 | 0.6 | 0.3 | 94 | 0.1 | 145 |
| 5 | 1.0 | 0.3 | 99 | 0.1 | 150 |
| 6 | 1.2 | 0.3 | 99 | 0.1 | 160 |
| 7 | 1.4 | 0.3 | 99 | 0.1 | 170 |
| 8 | 1.6 | 0.3 | 99 | 0.1 | 170 |
| 9 | 1.9 | 0.3 | 100 | 0.1 | 175 |
| 10 | 2.2 | 0.4 | 99 | 0.1 | 180 |
| average | | 0.3 | 97 | 0.1 | 154 |

EXAMPLE IV

For comparison purposes, experiments were conducted with a prior art resin having iminodiacetic acid functionality. A PVC column approximately 1½" diameter by 3" high containing approximately 90 mL of crushed resin manufactured by the Rohm and Haas Company under the trade name Amberlite IRC 718, was assembled. The crushed resin had a particle size of nominally 80–120 U.S. mesh.

A simulated electroless copper plating solution containing copper at a concentration of Cu=1.82 g/L and an undetermined amount of EDTA, was made up and diluted with deionized water by a factor of 100 to simulate a rinsewater. The simulated rinsewater then containing Cu=18.3 mg/L, an undetermined amount of EDTA and had a pH of 10.

The rinsewater was passed downflow through the column at a flow rate of 225 mL/min, which corresponded to a linear velocity of 5 U.S. gallons per minute per square foot of bedcross-sectional area (gpm/ft$^2$). After processing 450 mL or 5 bed volumes of rinsewater, the resin was regenerated by passing 325 mL of 2N sulphuric acid into the bottom of the column and out the top at a flow rate of 45 mL/min which corresponds to a linear velocity of 1 gpm/ft$^2$. The column was then rinsed by passing 825 mL of water into the top of the column and out the bottom at a flow rate of 45 mL/min for the first 325 mL and 225 mL/min for the last 500 mL. The cycle was repeated. The rinsewater leaving the bottom of the column was collected into two 225 mL portions. The first sample was found to contain Cu=4 mg/L and the second sample, Cu=15 mg/L. This corresponds to removal efficiencies of approximately 78% and 18% respectively. The amount of copper exchanged onto the resin was calculated as approximately 0.0441 grams of Cu per liter of resin. These levels of copper would not be sufficiently low to allow direct discharge to a sanitary sewer. In addition, the quantity of copper exchanged onto the resin was too little to be of any practical application.

In an effort to weaken the strength of the EDTA/Cu bond, the pH of the rinsewater was reduced to 2.6 using sulphuric acid. The experiment was repeated under the above conditions except that 675 mL of rinsewater was processed and collected in 3 samples of 225 mL each. These were analyzed as 14.6, 14.9 and 14.7 mg/L Cu successively, representing a removal of approximately 20% each and an exchange of 0.027 grams copper per liter of resin. From these results, it can be seen that lowering the pH to 2.6 did not improve uptake of copper.

In a further attempt to weaken the EDTA/Cu bond, the pH of the rinsewater was reduced to pH=2.0 using sulphuric acid. The experiment was repeated under the above conditions. The three 225 mL rinsewater samples leaving the column were analyzed as 14.8, 14.5 and 15.5 mg/L copper successively, corresponding to copper removals of approximately 19% down to 15% and an exchange of 0.0253 grams copper per liter of resin.

It is evident from these experiments that the iminodiacetate resin is not very effective in taking up copper from an EDTA containing electroless copper plating rinsewater. In addition to the poor removal efficiency, the capacity of the resin for copper is prohibitively low.

EXAMPLE V

In a manner analogous to that of Example III, the process is practiced with a pyridyl-imidazole resin to remove copper from an acidic solution containing copper, EDTA and ferric iron. Copper removal similar to that attained in Example III will be obtained.

While the present invention has been disclosed in connection with the preferred embodiments thereof, it should be understood that there are other embodiments which fall within the spirit and scope of the present invention as defined by the following claims.

We claim:

1. A process for removing copper ions from an acidic solution containing copper and an aminopolycarboxylic acid chelating agent, comprising:

contacting the acidic solution with a water insoluble ion exchange resin having a picolylamine or a pyridyl-imidazole functionality, whereby copper ions are retained by the resin and the chelating agent remains in the solution; and removing the solution containing the chelating agent from the resin, said solution having a reduced content of copper.

2. The process as claimed in claim 1, wherein the contacting step is conducted at a pH less than about 5.0 to weaken the bonding of copper to the chelating agent.

3. The process as claimed in claim 1, wherein the contacting step is conducted at a pH in the range of about 2.0 to 3.0 to weaken the bonding of copper to the chelating agent.

4. The process as claimed in claim 1, wherein the chelating agent is one whose bonds to copper can be weakened by the acidic pH of the solution.

5. The process as claimed in claim 1, wherein ferric or ferrous iron is added to the acidic solution to weaken the bonding of copper to the chelating agent, and wherein copper is selectively retained by the resin.

6. The process as claimed in claim 5, wherein the chelating agent is one whose bonds to copper can be weakened by the acidic pH of the solution, or by the presence of the iron ions in the solution.

7. The process as claimed in claim 1, 2 or 3, wherein the chelating agent is ethylenediaminetetraacetic acid (EDTA).

8. The process as claimed in claim 5, wherein the chelating agent is ethylenediaminetetraacetic acid.

9. The process as claimed in claim 8, wherein the pH of the acidic solution is less than about 5.0.

10. The process as claimed in claim 8, wherein the pH of the acidic solution is in the range of about 1.0 to 3.0.

11. The process as claimed in claim 10, wherein the pH of the solution is adjusted with aqueous sulphuric acid to the range of about 1.0 to 3.0.

12. The process as claimed in claim 1, 2 or 3, wherein after removing the solution from the resin, the resin is regenerated with an acidic solution to remove the copper from the resin.

13. The process as claimed in claim 1, 2 or 3, wherein the ion exchange resin has a bispicolylamine or an N-(2-hydroxypropyl) picolylamine functionality.

14. The process as claimed in claim 8 or 9, wherein the ion exchange resin has a bispicolylamine or an N-(2-hydroxypropyl) picolylamine functionality.

15. The process as claimed in claim 1, wherein the ion exchange resin has a bispicolylamine functionality, and wherein, after removing the solution from the resin, the resin is regenerated with a strong aqueous acid selected from the group consisting of sulphuric acid and hydrochloric acid to remove copper from the resin.

16. The process as claimed in claim 9, wherein the ion exchange resin has a bispicolylamine functionality, and wherein, after removing the solution from the resin, the resin is regenerated with a strong aqueous acid selected from the group consisting of sulphuric acid and hydrochloric acid to remove copper from the resin.

17. The process as claimed in claim 15 or 16, wherein the resin is regenerated with sulphuric acid which is at least about 10 N.

18. The process as claimed in claim 1, wherein the ion exchange resin has an N-(2-hydroxypropyl)picolylamine functionality, and wherein, after removing the solution from the resin, the resin is regenerated with an aqueous acid to remove copper from the resin.

19. The process as claimed in claim 9, wherein the ion exchange resin as an N-(2-hydroxypropyl)picolylamine functionality, and wherein, after removing the solution from the resin, the resin is regenerated with an aqueous acid to remove copper from the resin.

20. The process as claimed in claim 18 or 19, wherein the resin is regenerated with aqueous sulphuric acid which is in the range of about 1 to 2 N.

21. The process as claimed in claim 1, wherein the contacting step is conducted by passing the solution through a column containing the ion exchange resin, whereby the copper is retained by the resin, and wherein an effluent containing the chelating agent and having a reduced content of copper passes out of the column.

22. The process as claimed in claim 9, wherein the contacting step is conducted by passing the solution through a column containing the ion exchange resin, whereby copper is selectively retained by the resin, and wherein an eluate containing iron and the chelating agent passes out of the column.

23. The process as claimed in claim 21 or 22, which further comprises:
    regenerating the ion exchange resin by passing a strong acid solution through the column containing the resin, whereby the copper retained by the resin is removed from the column.

24. The process as claimed in claim 21 or 22, wherein the ion exchange resin has a bispicolylamine or an N-(2-hydroxypropyl) picolylamine functionality.

* * * * *